Patented June 22, 1954

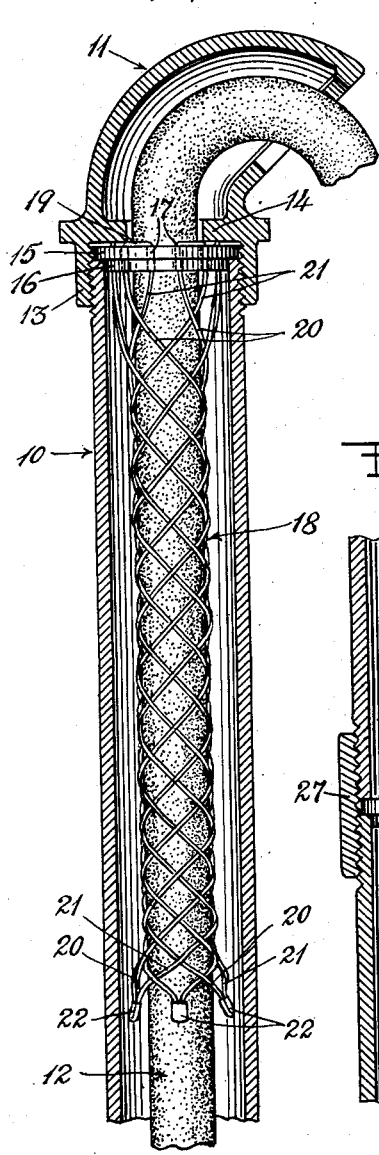
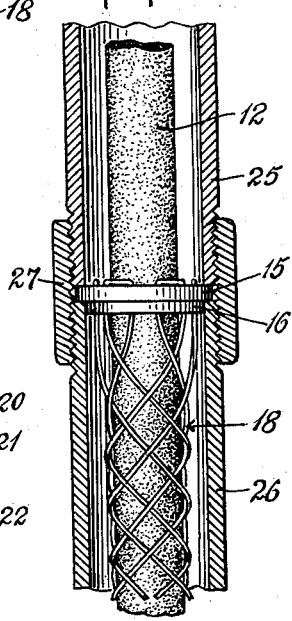
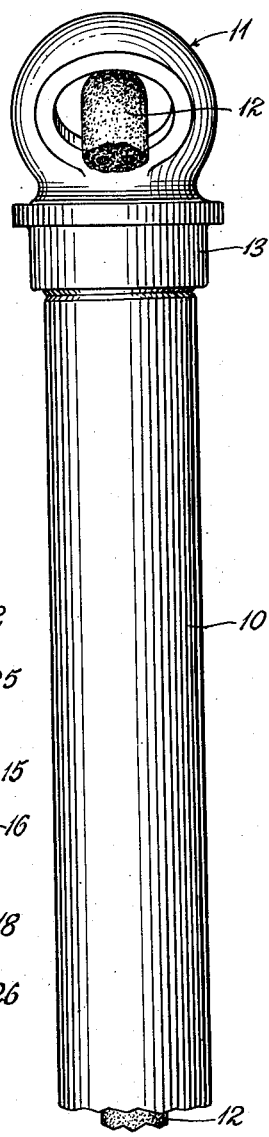
INVENTOR.
DAVID L. KELLEMS
BY
ATTORNEY

2,681,781

UNITED STATES PATENT OFFICE 2,681,781

CONDUIT RISER CABLE SUPPORT

David Loyal Kellems, Westport, Conn., assignor to Kellems Company, Saugatuck, Conn., a partnership Application January 29, 1949, Serial No. 73,512

3 Claims. (Cl. 248—60)

The invention relates to conduits for electrical conductors such as cables, and more particularly to vertically disposed conduits, which are known as conduit risers. In order to support a length of cable contained within a conduit riser, the art has heretofore employed clamps, wedges, etc., whose use often results in damage to the sheathing of the cable supported thereby. It is the principal object of the present invention to provide in such conduit risers an improved cable supporting device which will overcome the difficulties heretofore encountered in devices of this nature.

A further object of the invention is to provide a simply constructed cable support which may be readily assembled at an intermediate point of and/or at the upper end of a conduit riser to support a cable contained therein, which can be readily mounted on and will reliably support the cable to be contained in such riser without danger of damage to such cable, and which can be easily disengaged from such cable when the latter is to be shifted or withdrawn from the riser.

Other objects of the invention, as well as the novel details of construction thereof, will appear from the following description when read in connection with the accompanying drawings in which Fig. 1 is a vertical sectional view of the upper end portion of a conduit riser and showing a length of cable therein supported in accordance with the invention; Fig. 2 is a side elevational view of the parts shown in Fig. 1, and Fig. 3 is a vertical sectional view showing the manner in which the invention may be utilized intermediate the ends of a riser.

In the embodiment illustrated in Figs. 1 and 2 of the drawings, the reference character 10 indicates the upper end of a standard type of conduit riser. Mounted on the riser end 10 is an entrance cap 11 through which extends the bent emerging portion of an electrical cable 12 contained in the conduit riser. The entrance cap 11 is of standard construction and includes an internally threaded lower end portion 13 which is screwed on the externally threaded end 10 of the riser and an internal flange or shoulder 14 adjacent to the inner end of portion 13. Seated on the upper end 10 of the conduit riser and located intermediate such end and shoulder 14 of the cap 11 is a rigid annular ring 15 made of metal or any other suitable material and whose outside dimension is such that it readily fits within the end portion 13 of cap 11. Ring 15 may be provided with an annular shoulder 16 which readily fits inside the riser end 10 and which properly seats ring 15 on such riser end. Ring 15 has a width less than the combined thickness of such ring and shoulder 16 and is provided adjacent to its inner periphery with a plurality of circularly arranged spaced apertures 17 which extend also through the shoulder 16.

Depending from the ring 15 within the conduit riser is an open meshed tubular structure designated generally by the reference numeral 18. The structure 18 is composed of a plurality of wire strands which may be equal in number to one-half the number of apertures 17 as shown in the drawings, or which may be equal in number to the number of such apertures, in which latter construction, two sections or sides of adjacent wire strands will be threaded through each hole. Each wire strand has its intermediate portion 19 anchored on ring 15, and the equal length sides or sections 20 and 21 of each strand extend downwardly through two adjacent apertures 17, and below the ring 15, extend in spiral fashion towards the lower end of the structure 18. The sections 20 of the several wire strands spiral about the central longitudinal axis of the structure in a direction opposite to that of the sections 21 of such strands, and the strand sections 20 are interwoven or braided with the sections 21 of such strands as they spiral toward the lower end of the structure 18. At the lower end of structure 18, the free ends of the strand sections 20 and 21 are bound together in pairs by a plurality of coupling members or clips 22. As a result of this construction, there is formed an open meshed tubular structure which is permanently secured to ring 15 by reason of the fact that the latter is in effect woven into the structure to form an integral part thereof. The open mesh structure so formed may be considerably varied in diameter by endwise compression and expansion thereof. Thus, forces which would tend to compress or to reduce the length of the structure will cause the latter to expand in a radial direction, thereby enabling it to be slipped readily over a cable and when such forces are removed, the structure will contract immediately and automatically in a radial direction to cause the strands thereof to engage with the exterior surface of the cable. When an endwise pull or force is thereupon exerted on the open mesh structure, such as would tend to elongate it, as for example, the downward force created by the weight of the cable, the structure will reduce its cross-sectional area and thereby cause the strands thereof to engage or tighten upon the exterior surface of the cable and firmly secure the cable against slipping. Preferably, the normal diameter of the structure is such that it will accomodate cables having varying outside diameters within a predetermined range. For example, the cable supporting device illustrated in Fig. 1 of the drawings, should be able to hold a cable having a fifty percent greater outside diameter than that of the cable illustrated in such figure.

It will be understood from the foregoing, that in the use of the invention illustrated in Figs. 1 and 2 of the drawings, the cable may be drawn through the conduit riser until a portion thereof extends above the upper end of such riser. The projecting end portion of the cable then may be threaded through the open mesh structure 18. As the cable is then further drawn through the conduit, the structure may be forced over such drawn cable by the user grasping the ring 15 and either holding it stationary or moving it in a direction opposite to that in which the cable is being drawn. This sliding of the support over the cable will be accomplished with ease and without danger of the structure 18 binding on the cable, because any engagement of the woven strands of such structure with the sheathing of the cable, will only tend to decrease the length of the structure and consequently cause it to expand radially. When the cable has been drawn through the conduit riser to the extent desired, the lower end of the structure 18 is inserted into the upper end of the conduit and by a downward twisting movement, the holder or support is forced into the conduit until the ring 15 thereof seats on the upper end of the conduit. With the cessation of this downward pressure on the ring 15, the strands of the structure 18 will retract radially and come into gripping engagement with the exterior surface of the cable. During the foregoing operations, the cable will be held against slipping back into the conduit riser. When the cable is now released, it will settle somewhat because of its own weight, but in doing so will cause the structure 18 to expand slightly in a longitudinal direction and thereby cause the strands thereof to retract radially and secure a firmer grip on the cable. As the force exerted on the structure 18 by the cable will always be in a downward direction, the cable by its own weight will maintain the structure 18 firmly gripped thereon, so as to support it. When the entrance cap 11 is firmly secured in position on the riser 10, the ring 15 will be locked in position against displacement by the upper end of the conduit on which it is seated and the end portion 13 and shoulder 14 of such cap. To remove the support, it is only necessary to remove the entrance cap 11 and then compress the open mesh structure 18 thereof in a longitudinal direction, whereupon it may readily be slipped off the cable.

Fig. 3 of the drawings, illustrates the manner in which the cable support of this invention may be utilized between sections of a conduit riser to support the portion of the cable below the juncture of such sections. In this embodiment, the reference numerals 25 and 26 designate two conduit riser sections whose adjoining ends are provided with external screw threads and are connected together by a coupling nut or ring 27. Locked in position intermediate the opposing ends of such conduit sections is ring 15 of the cable support. The ring 15 and open mesh structure 18 of the support shown in Fig. 3 of the drawings are in all respects similar in construction and assembled in the same manner as the support illustrated in Figs. 1 and 2 of the drawings. It will be understood that one or more of such supports may be located at spaced points in a conduit riser and that at the upper end of such riser a support may be secured thereto substantially in the manner previously described.

While I have described and illustrated a preferred form of my invention, it will be apparent to those skilled in the art, that changes and modifications may be made therein without departing from the spirit of the invention or the scope of the appended claims.

I claim:

1. A device for supporting in depending relation a vertically disposed portion of a cable on the top of a conduit riser provided with a coupling means at such end, comprising a rigid, annular, disk-like member constituted of stiff material of substantial thickness and having an outer peripheral edge portion adapted to seat on the top end of the conduit riser, said member having an inside diameter greater than the outside diameter of the cable to be contained in such riser and less than the inside diameter of the riser and having an outside diameter less than the outside diameter of the riser so that such member provides a greater supporting surface area than the top end of the riser and the coupling means can be attached and detached without interference of said member, the inner peripheral portion of said member having a greater thickness than the outer peripheral portion thereof and forming a depending annular shoulder, said inner peripheral portion being adapted to be located inwardly of the wall of the riser and said annular shoulder having a diameter less than the inside diameter of the riser and adapted to be positioned adjacent to the inner surface of the upper end portion of the riser, and a cable gripping means depending from said member and being tubularly shaped so as to be open at both ends, said gripping means being composed of a plurality of wire strands extending through and connected in circular relation to said member in the inner peripheral edge portion thereof which projects inwardly from the wall of the riser, and below said member being interwoven to form an open mesh structure adapted to receive in surrounding gripping relation the upper end of the depending portion of the cable to be held, the normal diameter of said wire structure being less than the inside diameter of the riser to enable said wire structure to be received within the upper end of the riser with the cable extending therethrough.

2. A support for a depending, vertically disposed portion of an electric cable comprising a vertically disposed conduit for the cable, a rigid, annular disk-like member constituted of an integral piece of rigid material and of substantial thickness having its outer peripheral edge portion seated on the top end of said conduit, said member having an inside diameter greater than the outside diameter of the cable and less than the inside diameter of the conduit and having an outside diameter less than the outside diameter of the conduit, thereby providing a greater supporting surface area than the top of the conduit, a member disposed in spaced relation above the top end of said conduit and seated on said annular member, means connected to said spaced member and to the exterior surface of the upper end portion of said conduit so as to provide a recess for said annular member between said conduit and said spaced member and to secure said annular and spaced members to said conduit, and a longitudinally flexible cable gripping means depending from said member and being tubularly-shaped so as to be open at both ends, said gripping means being composed of a plurality of wire strands extending through and connected in circular relation to said annular member in the inner peripheral edge portion thereof which projects inwardly from the wall of the conduit, and below said annular member being interwoven to form an open mesh structure adapted to receive in surrounding gripping relation the upper end of the depending portion of the cable to be held, the normal diameter of said wire structure being less than the inside diameter of said conduit to enable said wire structure to be received within the upper end of the conduit with the cable extending therethrough.

3. A support for a depending, vertically disposed portion of an electric cable comprising a vertically disposed conduit for the cable, a rigid, annular disk-like member constituted of an integral piece of rigid material and of substantial thickness having its outer peripheral edge portion seated on the top end of said conduit, said member having an inside diameter greater than the outside diameter of the cable and less than the inside diameter of the conduit and having an outside diameter less than the outside diameter of the conduit, thereby providing a greater supporting surface area than the top of the conduit, the inner peripheral portion of said member having a greater thickness than the outer peripheral portion thereof and forming a depending annular shoulder located within the conduit, said annular shoulder having a diameter less than the inside diameter of said conduit and such as to be positioned adjacent to the inner surface of the upper end portion of the conduit, a member disposed in spaced relation above the top end of said conduit and seated on said annular member, means connected to said spaced member and to the exterior surface of the upper end portion of said conduit so as to provide a recess for said annular member between said conduit and said spaced member, to secure said annular and spaced members to said conduit and to coact with said shoulder to lock the outer peripheral edge portion of said annular member in proper position on the top of said conduit, and a cable gripping means depending from said member and being tubularly shaped so as to be open at both ends, said gripping means being composed of a plurality of wire strands extending through and connected in circular relation to said annular member in the inner peripheral edge portion thereof which projects inwardly from the wall of the conduit, and below said annular member being interwoven to form an open mesh structure adapted to receive in surrounding gripping relation the upper end of the depending portion of the cable to be held, the normal diameter of said wire structure being less than the inside diameter of said conduit to enable said wire structure to be received within the upper end of the conduit with the cable extending therethrough.

References Cited in the file of this patent

UNITED STATES PATENTS

| Number | Name | Date |
|---|---|---|
| 656,187 | Gunnell | Aug. 21, 1900 |
| 1,057,178 | Sessions | Mar. 25, 1913 |
| 1,069,819 | Sessions | Aug. 12, 1913 |
| 1,564,029 | Smith | Dec. 1, 1925 |
| 1,686,250 | Page | Oct. 2, 1928 |
| 1,732,410 | Martin | Oct. 22, 1929 |
| 1,802,657 | Kellems | Apr. 28, 1931 |
| 2,164,278 | Kellems | June 27, 1939 |
| 2,279,237 | Kellems et al. | Apr. 7, 1942 |
| 2,398,013 | Kyle | Apr. 9, 1946 |